United States Patent [19]

MacDonald

[11] 3,874,709

[45] Apr. 1, 1975

[54] TUBING FITTING

[75] Inventor: Robert D. MacDonald, Metamora, Mich.

[73] Assignee: Cardinal of Adrian, Inc., Dryden, Mich.

[22] Filed: July 23, 1973

[21] Appl. No.: 381,844

Related U.S. Application Data

[63] Continuation-in-part of Ser. No. 290,194, Sept. 18, 1972, abandoned.

[52] U.S. Cl. .............. 285/104, 285/340, 285/348, 285/423
[51] Int. Cl. ................... F16l 17/00, F16l 33/16
[58] Field of Search .......... 285/104, 105, 111, 340, 285/348, 423, DIG. 16, 22, 81

[56] References Cited
UNITED STATES PATENTS

| | | | |
|---|---|---|---|
| 1,119,858 | 12/1914 | Murphy | 285/22 |
| 2,967,723 | 1/1961 | Willis | 285/105 X |
| 3,112,939 | 12/1963 | Graham | 285/DIG. 16 |
| 3,204,988 | 9/1965 | Ouderkik et al. | 285/340 X |
| 3,239,247 | 3/1966 | Pickert | 285/348 X |
| 3,264,013 | 8/1966 | Richardson et al. | 285/22 |
| 3,265,414 | 8/1966 | Reid et al. | 285/348 |
| 3,312,483 | 4/1967 | Leadbetter et al. | 285/423 X |
| 3,591,205 | 7/1971 | Hamburg | 285/81 |
| 3,633,944 | 1/1972 | Hamburg | 285/81 |
| 3,633,944 | 1/1972 | Hamburg | 285/340 X |

FOREIGN PATENTS OR APPLICATIONS

| | | | |
|---|---|---|---|
| 808,658 | 7/1957 | Germany | 285/348 |
| 681,164 | 1/1965 | Italy | 285/111 |

Primary Examiner—H. Hampton Hunter
Attorney, Agent, or Firm—Cullen, Settle, Sloman & Cantor

[57] ABSTRACT

A pre-assembled tubing coupling or fitting including a sleeve, a retaining ring, a resilient sealing ring disposed external to said retaining ring, and a cap or plug. The cap is disposed to limit axial movement of the sealing ring and the coupling is pre-assembled so that upon insertion of a conduit into the coupling, an interference fit is formed between the conduit and the retaining ring and a seal is formed between the sleeve and the conduit, without the necessity of further assembly or tightening of the cap.

5 Claims, 7 Drawing Figures

TUBING FITTING

CROSS-REFERENCE TO RELATED APPLICATION

This is a continuation-in-part of my copending application, Ser. No. 290,194, filed Sept. 18, 1972 now abandoned.

BACKGROUND OF THE INVENTION

In the use of fittings for a slip-in coupling, it is known in the prior art to use a sheet metal retaining or grab ring having inwardly directed teeth dimensioned to create an interference fit with the outer diameter of a tube or conduit. The teeth taper conically inwardly, so that they deflect upon insertion of the tube, but bite into the tube when withdrawal of the tube is attempted. These prior art fittings also generally employ a flexible sealing ring placed axially inwardly of the grab ring, and rely at least partially upon the axial pressure of the grab ring against the sealing ring, as induced by a threaded cap, to establish an effective seal.

However, one problem with this prior art structure, is that the axial position of the sealing ring results in the seal acting against a portion of the tubing or conduit which has been scratched because of its insertion through the interfering teeth of the grab ring. This decreases the effectiveness of the seal.

Furthermore, where there is a longitudinal force exerted on the fitting which would have the effect of accidentally removing the conduit, the interference fit between the grab ring and the conduit tends to pull the grab ring away from the seal, thus increasing the opportunity for leakage.

Additionally, with prior art fittings, an overlengthening of the plug or cap may deform the seal away from proper sealing contact with the conduit and the sleeve.

Thus, the present invention relates to an improved tubing coupling including an improved means for fastening a conduit to the coupling and for sealing the coupling against leakage.

SUMMARY OF THE INVENTION

The invention herein relates to a tubing coupling or fitting for fastening a conduit into a sleeve. The fastening means includes a grab or retaining ring formed of thin, springy metal and a resilient sealing ring which is disposed axially outwardly of the grab ring. A cap is disposed outwardly of the sealing ring to limit axial movement of the sealing ring. The cap, sealing ring and grab ring are pre-assembled to the sleeve to form a complete coupling. Upon insertion of a conduit into the coupling, an interference fit is formed between the conduit and the grab ring and a seal is formed between the sleeve and the conduit, without further operation.

Once a conduit has been inserted into the fitting or coupling, the coupling may be rotated to line up an open end of the coupling with a second conduit.

It is an object of the present invention to improve the sealing properties of a tubing fitting.

It is another object of the present invention to overcome the shortcomings of the prior art by providing an improved, pre-assembled tubing fitting wherein the seal does not operate on a portion of the conduit which has been scratched by the grap ring.

BRIEF DESCRIPTION OF THE DRAWINGS

The foregoing objects of the invention, together with other objects and advantages which may be attained by its use, will become more apparent upon reading the following detailed description of the invention, taken in conjunction with the drawings.

In the drawings, wherein like reference numerals identify corresponding parts.

DETAILED DESCRIPTION OF THE INVENTION

Figure 1:
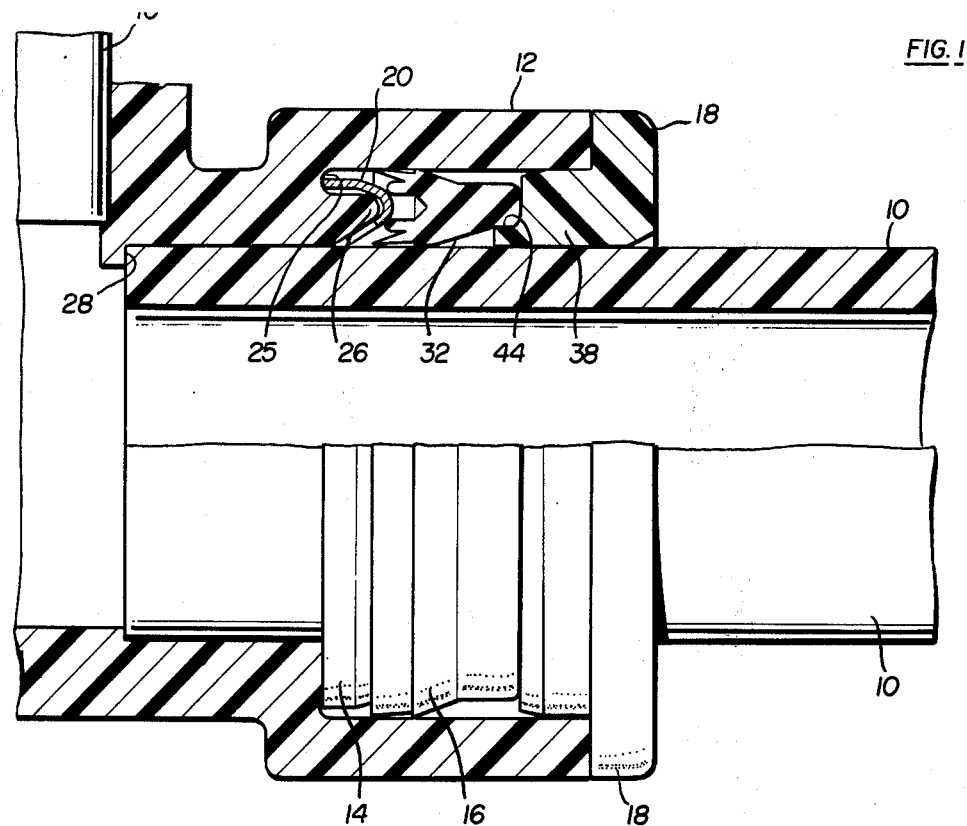
FIG. 1 is a cross-sectional side elevation of the conduit and coupling assembled according to the present invention.

The improved tubing fitting or coupling of the present invention is illustrated in FIG. 1 securing a pipe, tube or conduit 10 into the sleeve 12 of the coupling. The fitting or coupling includes a grab ring or retaining ring 14, a resilient sealing ring 16 and a cap or plug 18. The present invention particularly lends itself to use with non-metallic tubings, fittings, and plugs, but is not necessarily confined to such applications.

Referring to FIGS. 1-4, the grab ring or retaining ring 14 is a metallic element, preferably made of springy stainless steel, and includes a contoured portion 20 which, in cross-section, takes the shape of a "U" and has a conical flange 22 which extends inward both axially and radially, In the following discussion, "axially inward" refers to the direction of insertion of the tube 10 into the sleeve 12. The conical flange 22 defines an annular conduit gripping edge which may have notches to define a plurality of teeth 24.

The outside diameter of the grab ring 14 is such that it can be readily slipped into the sleeve 12 and, upon such insertion, it may engage an inner shoulder 25 within the sleeve. This shoulder may be part of an inner longitudinal lip 26 as in FIGS. 1 and 2 or it may be a relatively flat shoulder as in FIGS. 3 and 4. If a lip is utilized as in FIGS. 1 and 2, the lip is shaped substantially the same as the contour 20 of the grab ring to prevent possible buckling or collapse of the contoured portion of the grab ring under the stress of an interference fit.

Figure 3:
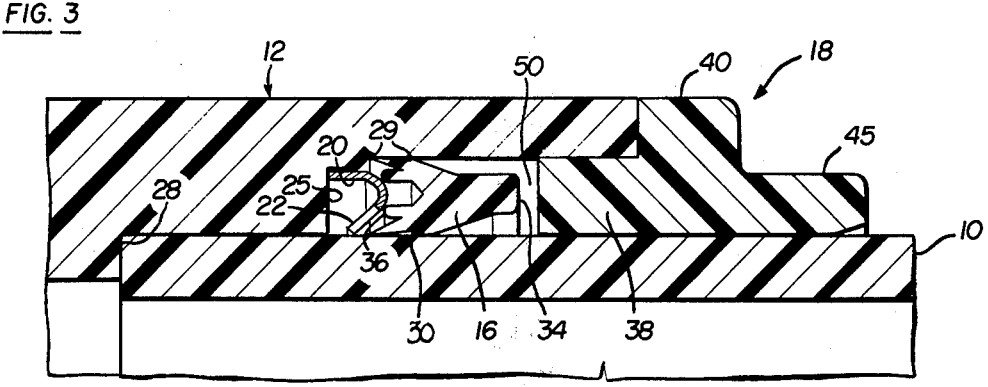
FIG. 3 is a partial cross-sectional side elevation of a conduit and a modified coupling assembled according to the principles of this invention.
Figure 4:
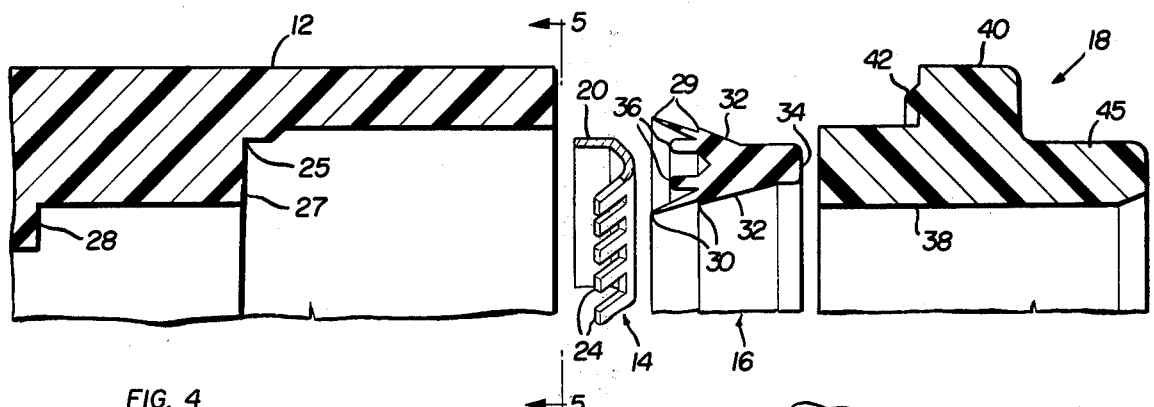
FIG. 4 is an exploded view of the connector of FIG. 3.
Figure 5:
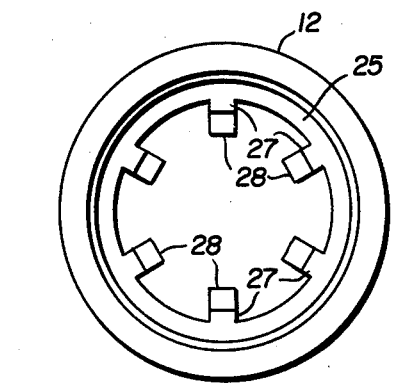
FIG. 5 is an end view of the sleeve as seen in the direction of arrows 5—5 of FIG. 4.

The outer sleeve 12 may also include a plurality of axial ribs 27 as shown in the embodiment of FIGS. 3-5. The outer ends of the ribs are extensions of the annular shoulder 25.

It may be appreciated that the lip 26 and the annular shoulder 25 provide substantially the same function in that they limit or stop the inward motion of the grab ring. The ribs 27 are preferred since they provide a stop with a minimum amount of material. Thus if the sleeve is manufactured of a molded plastic, the use of ribs reduces molding problems such as shrinkage and the like.

Whether the internal lip 26 or the axial ribs 27 are utilized, the sleeve is provided with another internal shoulder 28. This shoulder 28 serves to limit the extent of insertion of the tube 10. If axial ribs are utilized, as in FIGS. 3 and 4, each shoulder 28 may be formed as an inward projection on a rib 27.

It will be appreciated that as the tube 10 is inserted through the grab ring 14, the teeth 24 of the grab ring will scratch or otherwise mar the outer surface of the tube. This scratching, which is occasioned by the interference fit, renders a portion of the surface of the tube 10 unsatisfactory for sealing purposes. To overcome this problem the grab ring 14 is disposed axially inward of the seal 16. Thus, the seal is in contact with a portion of the tube which has not been damaged by the teeth 24.

The seal 16 is manufactured from a resilient material, such as rubber, and is U shaped in cross-section. The seal includes a plurality of outer legs or projections 29 and inner legs or projections 30. Both the inner and outer walls 32 of the seal are tapered from a base 34 to increase in diameter toward the grab ring 14. In addition, at the wider portion of the seal 16 are two longitudinal tabs 36 which abut the grab ring and are spread apart by axial pressure of the grab ring to increase the sealing pressure.

The seal 16 is preferably dimensioned to establish a seal-creating interference fit between the outer legs 29 and the inner diameter of the sleeve 12 even in the absence of a tube or conduit 10. Similarly, an interference fit is created between the inner legs 30 of the sealing ring and the outer diameter of the conduit or tube 10. The sealing pressure of both of these inner and outer sealing legs is enhanced by the wedging action of the contour 20 of the grab ring 14 which further forces the outer legs 29 against the sleeve 12 and the inner legs 30 against the conduit 10 as the assembly is axially tightened.

Figure 2:
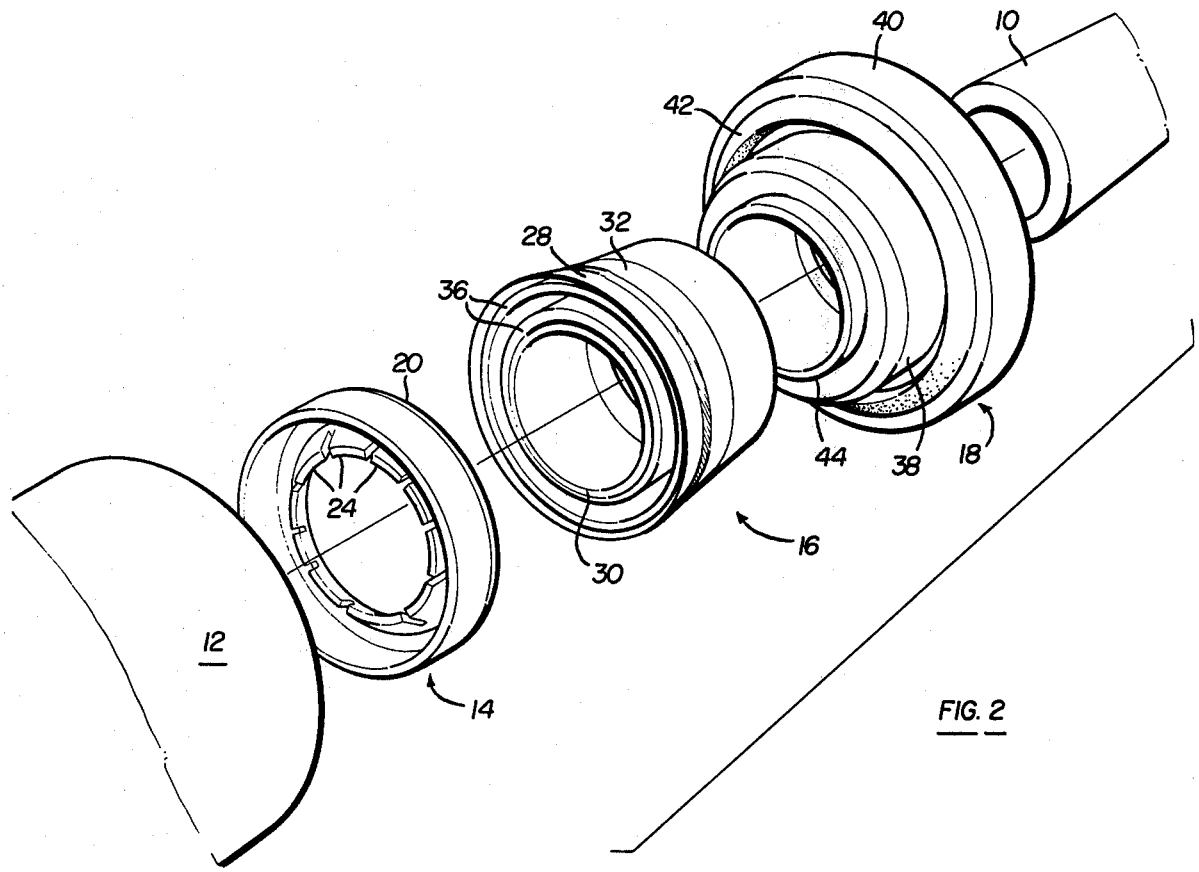
FIG. 2 is an exploded perspective view of the conduit and coupling of the present invention.

The annular cap or plug 18 includes a body portion 38 having an enlarged rearward radial flange 40. This radial flange 40 includes a small annular bead 42. In the embodiment of FIGS. 1 and 2, the main body 38 terminates in a forwardly projecting collar or sleeve 44 and both the main body 38 and the collar or sleeve 44 limit the axial movement of the sealing ring when the fitting is assembled.

In the embodiment of FIGS. 3 and 4, the flange 40 is provided with a rearward extending collar 45.

When the coupling is assembled and a conduit 10 inserted therethrough, the pressure from the flow of water through the coupling tends to cause the sealing ring and the grab ring to shift axially outward toward the cap. Depending upon the amount of pressure, the seal 16 may distort and cause leakage. To overcome this problem, in the embodiments of FIGS. 3 and 4, an axial gap 50 is provided between the body 38 of the cap and the base 34 of the sealing ring. This axial gap provides room for the rubber seal to flow or shift axially outward, without distortion, in response to fluid pressure through the coupling.

The inner diameter of the annular plug or cap 18 permits a slip-fit insertion of a conduit 10 and the outer diameter of the main body of the plug permits it to be readily slipped into the sleeve 12. Thus, the dimensional arrangement of the sleeve 12 and plug 18 permits these elements to be threaded together with space-conserving internal threads (not illustrated) on the sleeve. Alternatively, these elements may be secured by ultrasonic welding as facilitated by the annular bead 42 or by a plastic solvent as is well known in the art.

One feature of the present invention is that the fitting may be pre-assembled at the place of manufacture to form a complete unit. In so doing, the grab ring 14 may be first inserted into the sleeve 12 to engage the shoulder 25. The sealing ring 16 may then be inserted and finally the cap 18 inserted and secured to the sleeve in any one of the previously explained fashions. If threaded fastening is utilized, the cap and sleeve are also pre-torqued to the desired tightness. This pre-assembled fitting may then be shipped to an installation site where a conduit 10 is inserted through the cap and into the fitting. The installer need not tighten the cap since its assembly to the sleeve was completed at the place of manufacture. Thus there is a water-tight or fluid-tight seal formed between the sleeve and the conduit. At the same time, an interference fit is formed between the teeth of the grab ring 14 and the conduit 10. This interference fit may be as strong as desired since the teeth 24 may be designed to bite much more deeply into the conduit 10 than in the prior art where excessive scratching of the conduit upon assembly had to be avoided because it resulted in leakage.

Should there be a reverse or axially outward pull on the conduit 10, it will be resisted by the biting or gripping force of the teeth 24. Furthermore, even the slightest outward motion of the grab ring will increase the seal between the sleeve and the conduit since such motion will pull the grab ring against the seal and subsequently against the cap (whether or not an axial gap 50 is provided). It is important to note that the sealing ring is acting upon a portion of the tubing which is un-scratched, i.e., upon a portion of the conduit which did not pass through the teeth of the grab ring during assembly.

Figure 6:
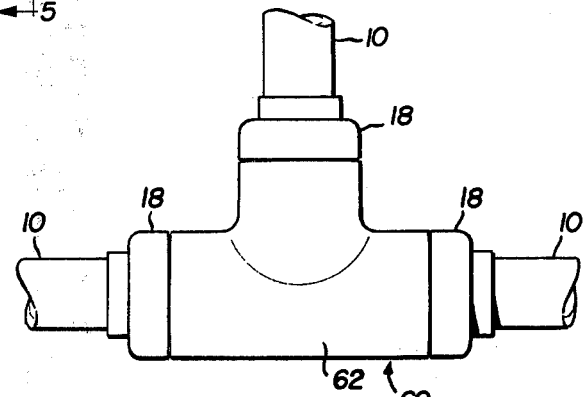
FIG. 6 is an illustration of a "T" fitting according to the principles of this invention.

FIG. 6 illustrates a T fitting 60 having a body 62 and three annular caps 18, with three conduits 10 inserted into the fitting. Thus, it may be appreciated that the fitting may be formed for any desired plumbing arrangement.

Since it may be necessary during installation to line up various conduits, each conduit and its associated grab ring are rotatable within the fitting. Specifically, as the grab ring bites into the conduit 10, the fitting or coupling may be rotated because the grab ring does not bite into the outer sleeve. In the embodiment of FIGS. 1 and 2, the interlocked grab ring and conduit may thus rotate relative to lip 26 and the sleeve. Similarly, in the embodiment of FIGS. 3 and 4, the interlocked grab ring and conduit may be rotated relative to the shoulder 25.

The ability to line up various plumbing arrangements such as an elbow connected to a T, etc., without disassembling or loosening the fitting, results in faster assembly of the plumbing fixtures. This benefit is diagrammatically illustrated in FIG. 7 where there is an elbow fitting 64 having a cap 18 at each end. A first tube 66 is inserted through the cap at a first end of the elbow and the longitudinal axis of this tube 66 may be considered the axis of rotation of the elbow 64.

Figure 7:
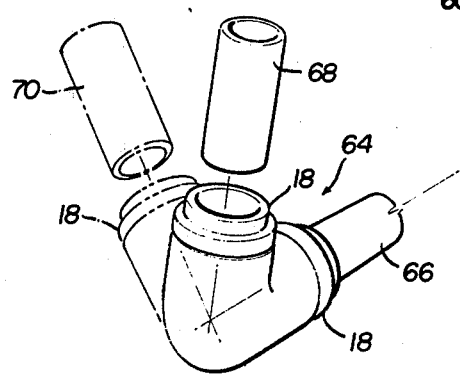
FIG. 7 is a perspective illustration of an elbow fitting illustrating the rotatability of the fitting with respect to a conduit without affecting the sealing properties of the fitting.

Should it be desired to insert a tube 68 into the opposite end of the elbow 64, as shown in the solid lines, this may be easily done. However, should it occur that the tube is in a position 70 as illustrated in a dotted outline, it is necessary to rotate the elbow with respect to the axis of tube 66. According to the present invention, the type of fit between the grab ring and the outer sleeve permits this to be done easily and the elbow may be rotated to its dotted position as illustrated in FIG. 7 to receive the tube 70, without the necessity of loosening or disassembling the previous connection between tube 66 and elbow 64.

The foregoing is a description of the concepts of the present invention and should, therefore, not be read in a restrictive sense. The invention may be further developed within the scope of the following claims.

What is claimed is:

1. An improved pre-assembled sleeve type conduit coupling of the type wherein a conduit is coupled merely by stabbing it into the open end of the coupling sleeve bore, comprising:

a grab ring formed of thin springy metal having a smooth outer edge and a conical flange converging radially inwardly toward the coupling bore and axially inwardly away from the open end of the coupling bore, the innermost edge of the flange defining a conduit receiving bore which is normally smaller than the outer diameter of the conduit but which resiliently yields upon insertion of the conduit and which is provided with non-helical conduit gripping means for engaging and gripping the conduit upon attempted withdrawl of the conduit from the coupling;

said grab ring and conduit being freely jointly rotatable relative to the coupling;

a resilient sealing ring having a bore for receiving the conduit and having a first sealing surface for yieldably engaging and sealing against the outer periphery of the conduit at a point axially outwardly of the conduit gripping means toward said open end of said coupling sleeve and a second sealing surface for yieldably engaging and sealing against the coupling bore;

and an annular cap pre-assembled to the coupling and having a shoulder for limiting axially outward movement of said sealing ring toward the open end of the coupling bore;

said grab ring and said sealing ring having abutting surfaces which cooperate upon attempted withdrawl of the conduit and during elevated fluid pressure within the coupling for axially compressing said sealing ring between said grab ring and said cap thereby increasing the radial sealing forces at said first and second sealing surfaces.

2. The coupling of claim 1 wherein the sleeve is provided with a first radially extending internal shoulder which acts as a positive stop for limiting axial insertion of the conduit and a second internal shoulder which acts as a positive stop for limiting axial insertion of said grab ring;

the sleeve and said cap having cooperating surfaces which limit the axially inward positioning of said cap relative to the sleeve, said cap being permanently and non-adjustably pre-assembled to the sleeve to establish a predetermined and fixed axial distance between said cap shoulder and said second sleeve shoulder for limiting and controlling the space available for axial movement of said sealing ring.

3. The coupling of claim 1 wherein said sleeve is provided with a plurality of axial ribs, each rib having a first radially extending internal shoulder which acts as a positive stop to limit axial insertion of the conduit, and a second radially extending internal shoulder which acts as a positive stop to limit axial insertion of said grab ring;

said second internal shoulder being axially outwardly of said first internal shoulder.

4. The coupling of claim 1 wherein said grab ring and said sealing ring are discrete elements separately inserted into said pre-assembled coupling.

5. An improved pre-assembled conduit coupling of the type wherein a conduit is coupled merely by stabbing it into the open end of a coupling sleeve, comprising:

a grab ring having a smooth outer edge and a conical flange converging radially inwardly towards the coupling bore and axially inwardly away from the open end of the coupling bore, the innermost edge of said conical flange having non-helical conduit gripping means for engaging and for gripping said conduit upon attempted withdrawal of the conduit from the coupling;

said grab ring and the conduit being freely jointly rotatable relative to the coupling sleeve;

a resilient sealing ring having a first sealing surface for yieldably engaging and for sealing against the outer periphery of the conduit at a point axially outwardly of the conduit gripping means toward said open end of said coupling sleeve and a second sealing surface for yieldably engaging and sealing against the interior of the coupling sleeve;

an annular cap having a shoulder for limiting axially outward movement of said sealing ring toward the open end of the coupling sleeve;

said grab ring and said sealing ring having abutting surfaces which cooperate upon attempted withdrawal of the conduit and during elevated fluid pressure within the coupling for axially compressing said sealing ring between said grab ring and said cap for increasing the radial sealing forces at said first and second sealing surfaces;

said coupling sleeve being provided with a first radially extending internal shoulder for positively limiting axial insertion of the conduit and a second radially extending internal shoulder which extends inwardly less than said first radially extending internal shoulder, said second radially extending internal shoulder for limiting axial insertion of said grab ring;

said sleeve and said cap having cooperating axial edges for limiting the axially inward position of the said cap relative to said sleeve, the cap being permanently and non adjustably assembled to the sleeve prior to the insertion of said conduit to establish a predetermined and fixed axial distance between said cap shoulder and said second radially extending inward free shoulder for limiting and controlling the space for axial movement of said sealing ring; and said fixed axial distance between said cap shoulder and said second radially extending internal shoulder being greater than the normal uncompressed combined axial length of said grab ring and said sealing ring for providing limited axial movement of the conduit relative to the coupling without axially compressing said sealing ring.

* * * * *